United States Patent
Knoblauch et al.

(10) Patent No.: US 11,453,200 B2
(45) Date of Patent: Sep. 27, 2022

(54) NON-FLAMMABLE PANEL WITH REAL WOOD VENEER AND METHOD OF MANUFACTURE

(71) Applicant: Knauf Gips KG, Iphofen (DE)

(72) Inventors: Karl Michael Knoblauch, Werbach (DE); Markus Riessler, Volpertshausen (DE)

(73) Assignee: Knauf Gips KG, Iphofen (DE)

(*) Notice: Subject to any disclaimer, the term of this patent is extended or adjusted under 35 U.S.C. 154(b) by 217 days.

(21) Appl. No.: 16/310,862

(22) PCT Filed: Jul. 13, 2016

(86) PCT No.: PCT/EP2016/001211
§ 371 (c)(1),
(2) Date: Dec. 18, 2018

(87) PCT Pub. No.: WO2018/010758
PCT Pub. Date: Jan. 18, 2018

(65) Prior Publication Data
US 2020/0307156 A1    Oct. 1, 2020

(51) Int. Cl.
*B32B 7/12* (2006.01)
*B32B 21/14* (2006.01)

(52) U.S. Cl.
CPC ............... *B32B 7/12* (2013.01); *B32B 21/14* (2013.01); *B32B 2255/08* (2013.01); *B32B 2307/3065* (2013.01); *B32B 2307/404* (2013.01); *B32B 2307/4023* (2013.01); *B32B 2317/16* (2013.01); *B32B 2479/00* (2013.01); *B32B 2607/00* (2013.01)

(58) Field of Classification Search
CPC ....... B32B 7/12; B32B 21/14; B32B 2255/08; B32B 2307/3065; B32B 2307/4023; B32B 2307/404; B32B 2317/16; B32B 2479/00; B32B 2607/00
See application file for complete search history.

(56) References Cited

U.S. PATENT DOCUMENTS

| | | | |
|---|---|---|---|
| 2006/0070321 A1* | 4/2006 | Au | C04B 28/26 52/232 |
| 2009/0007513 A1 | 1/2009 | Moreno G. | |
| 2015/0314564 A1 | 11/2015 | Mancini et al. | |
| 2017/0120564 A1* | 5/2017 | Schulte | E04F 15/045 |

FOREIGN PATENT DOCUMENTS

| | | | |
|---|---|---|---|
| CN | 104312444 A | * | 1/2015 |
| CN | 104552490 A | | 4/2015 |
| CN | 104118018 B | | 5/2016 |

(Continued)

OTHER PUBLICATIONS

Translation of CN104118018. (Year: 2016).*

(Continued)

*Primary Examiner* — Catherine A. Simone
(74) *Attorney, Agent, or Firm* — The Webb Law Firm

(57) ABSTRACT

The invention relates to a non-flammable panel with real wood veneer and a method for manufacturing such a panel. The non-flammable panel is characterized by a non-flammable carrier board and a thin real wood veneer which was laminated onto the carrier board by means of a mineral glue.

7 Claims, 1 Drawing Sheet

(56) References Cited

FOREIGN PATENT DOCUMENTS

Figure 1:
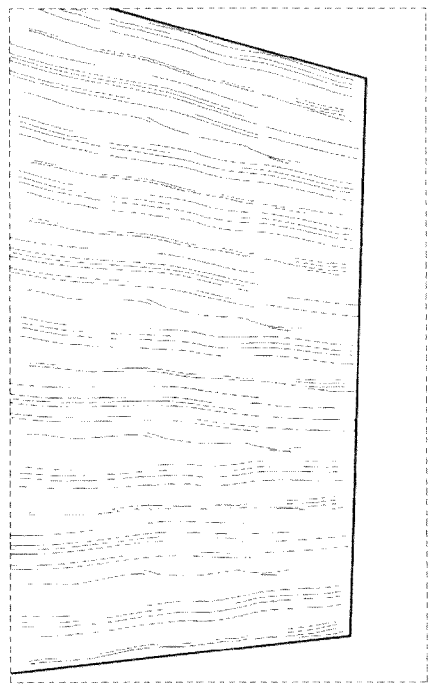

DE      202010003735 U1    8/2010
WO         2014011110 A1    1/2014
WO      WO-2015078434 A1 *  6/2015   ............. B32B 21/08
WO      WO-2015176093 A1 * 11/2015   ........... B32B 27/306

OTHER PUBLICATIONS

Translation of CN104893592A (abstract, description and claims). (Year: 2015).*
Translation of WO2015176093 (bib, description and claims). (Year: 2015).*

* cited by examiner

NON-FLAMMABLE PANEL WITH REAL WOOD VENEER AND METHOD OF MANUFACTURE

CROSS-REFERENCE TO RELATED APPLICATION

This application is the United States national phase of International Application No. PCT/EP2016/001211 filed Jul. 13, 2016, the disclosure of which is hereby incorporated in its entirety by reference.

BACKGROUND OF THE INVENTION

Field of the Invention

The invention relates to non-flammable panels with real wood veneer as well as a method for manufacturing panels with real wood veneer. In particular the invention relates to panels in which the real wood veneer is laminated on by means of a non-flammable adhesive.

Description of Related Art

Non-flammable panels are known from the prior art, for example, gypsum fibre boards, concrete panels and similar. These panels comply with the regulations for fire safety insofar as they can be used in particular in particularly endangered areas, for example for equipping escape routes, areas for large gatherings of people such as cinemas or areas with increased requirements such as in hospitals.

These panels can be provided with all possible kinds of surfaces in order to enable particular effects or an approximation to other architectural components. However, as a result of the requirement for non-flammability the choice of creative means is restricted to means which have only a low combustibility or zero combustibility in the sense DIN EN 13501-1. Thus it is generally not possible to use wood surfaces for panels which should satisfy building material class A2 or higher. Specifically wood surfaces however offer a design which is very sought after by architects.

It is known from the prior art to provide non-flammable panels with a multi-colour printing. By means of this multi-colour printing, a surface having a low calorific value can be produced which has the visual appearance of a wood surface. However, on closer inspection, it is nevertheless clearly discernible that this is not a real wood surface. Colour and feel of the surface clearly differ. Furthermore, by this method it is also difficult to achieve the A2 class of non-flammability because the printed paper webs which are usually laminated-on and also the colours used generally have a high calorific value.

A further requirement consists in adapting the wood to be used to the desired visual appearance or the visual appearance of other architectural components so that a creatively prevailing overall impression can be achieved. For example, at the present time the visual appearance of weathered silver-grey wood is much in demand. An adaptation to a desired visual overall impression can be achieved in a very elaborate and expensive manner by a selection of the wood to be used according to the predefined criteria. A simpler and more favourable solution is urgently required.

It is therefore the object of the invention to provide a non-flammable panel which at least satisfies the requirements A2 s1-d0 of DIN EN 13501-1 and which has a real wood surface. Another object consists in the visual adaptability of the panel to a creative overall impression.

DESCRIPTION OF THE INVENTION

The object is solved by means of a panel which comprises a non-flammable carrier board (at least building material class A2 s1-d0) which is laminated on at least one side with a wood veneer having a maximum thickness of 0.5 mm, preferably a maximum thickness of 0.3 mm. The wood veneer is laminated onto the non-flammable carrier board by means of a mineral glue, in particular water glass.

Since the carrier board itself consists of a non-flammable material in accordance with DIN EN 13501-1, the wood veneer has only a very small thickness and the adhesive is non-flammable, the panel overall also achieves a fire safety class A2 s1-d0 in accordance with DIN EN 13501-1. The requirement for this however is that the appropriate dimensions are adhered to and strictly non-flammable materials are used wherever possible. Water glass furthermore has the advantage that it does not decompose even at high temperatures so that in the event of a fire, the veneer does not detach from the carrier board.

All water glasses based on K, Na and Li water glasses can be used. Water glasses based on K are preferred. The modulus is such that a good adhesiveness is achieved but the workability is still sufficient. If the water glass modulus is too low, the adhesive force between wood veneer and carrier board is not sufficient to ensure a sufficiently firm connection for the desired use of the panel. If the modulus is too high, the water glass is difficult to process as a result of the high viscosity and cannot be applied sufficiently thinly to the components in order to be able to produce high-quality products.

In order to upgrade lower-quality wood types or be able to adapt the visual appearance of the panel to a desired overall impression, the wood can be printed at least in some areas. Thus, for example, the wood structure can be made more vibrant or the basic colour can be changed. All other variants of the colour design for example as a result of a multi-coloured digital printing can be used. In this case, preferably water-based printing inks, particularly preferably with mineral pigments are used.

The applied wood veneer can consist of a soft wood which is generally deemed to have a lower quality than hard wood. In order nevertheless to achieve the impression of a hard wood, the veneer can be printed so that the visual appearance of a hard wood is obtained. Since soft wood is also a structured wood, the printing is convincing as a result of the natural wood feel which is present.

Both the wood veneer as such and also a printed wood veneer can be covered with a top-coat lacquer in order to make the veneer more resistant to chemical or physical damage. Preferably a varnish system based on UV varnish can be used as top-coat lacquer. Compared with other top-coat lacquer systems used in this area this varnish system has the advantage that it is low in VOCs (volatile organic compounds), resistant to light and highly scratch-resistant.

According to a particularly preferred embodiment of the invention, a gypsum-based carrier board is used as the carrier board, in particular a gypsum fibre board. Gypsum fibre boards achieve the required fire safety class according to DIN EN 13501-1, are very resistant and as a result of the crystal-water of the gypsum, have a built-in "cooling device".

However, carrier boards made of other non-flammable materials can also be used. Thus, the carrier boards can for example consist of concrete panels, cement-bound panels, calcium silicate panels, metal panels, in particular made of a metal sheet or of a composite panel, in particular a non-flammable aluminium composite panel.

The non-flammable carrier board is laminated at least on one side with a wood veneer. However, it can also be provided on both sides with a wood veneer or on one side with a wood veneer and on the other side with another surface finish. Preferably the carrier board is only laminated on one side.

In addition to the panel, a method for manufacturing a non-flammable panel is also to be protected within the framework of this patent. The said method is characterized by a non-flammable carrier board which is laminated at least on one side with a wood veneer, wherein the wood veneer is applied by means of a mineral glue. The mineral glue preferably comprises a water glass.

The gluing or laminating of the carrier board with the wood veneer is preferably carried out whilst applying pressure (and temperature).

The wood veneer, which is applied to the non-flammable carrier board, preferably has a thickness of less than 1 mm, in particular of less than 0.6 mm. Naturally thicker wood veneers can also be used. Since however the panel is preferably to be equipped as non-flammable according to DIN EN 13501-1, a smaller veneer thickness is to be preferred. Greater veneer thicknesses must be removed again in a subsequent material-removing step to achieve the non-flammability.

Too small veneer thickness are also not recommended because they are difficult to handle and too sensitive to mechanical damage.

According to a particularly preferred embodiment of the invention, after drying of the adhesive the laminated wood veneer is polished to the smallest possible thickness. Thicknesses of 0.2 to 0.6 mm, preferably of 0.2 to 0.3 mm have proved easy to manufacture and have a calorific value which lies within the framework of the non-flammability requirements.

Optionally, the laminated, polished wood veneer can then be printed. The printing can be performed, for example by means of a digital printer. Particularly preferably a water-based ink is used for printing.

A further preferred embodiment of the invention provides for the application of a top-coat lacquer to the printed or unprinted wood veneer. The top-coat lacquer can fulfil various purposes, see the explanations further above.

The panels thus produced can be used as floor, wall or ceiling panels and also as structural elements for non-flammable (wood) furniture.

The invention is explained in detail hereinafter with reference to two specific exemplary embodiments.

FIG. 1 shows a non-flammable panel which was laminated with a 0.3 mm thick beech wood veneer and covered with a top-coat lacquer. The beech wood veneer was laminated in a thickness of 0.6 mm by means of a K-water glass glue onto a gypsum fibre board having a density of 1100 kg/m$^3$ and a thickness of 12 mm whilst applying pressure and temperature.

The wood veneer was polished to a thickness of 0.3 mm after drying of the water glass glue and covered with a top-coat lacquer. The panel can be used as a floor, wall or ceiling panel.

Figure 2:
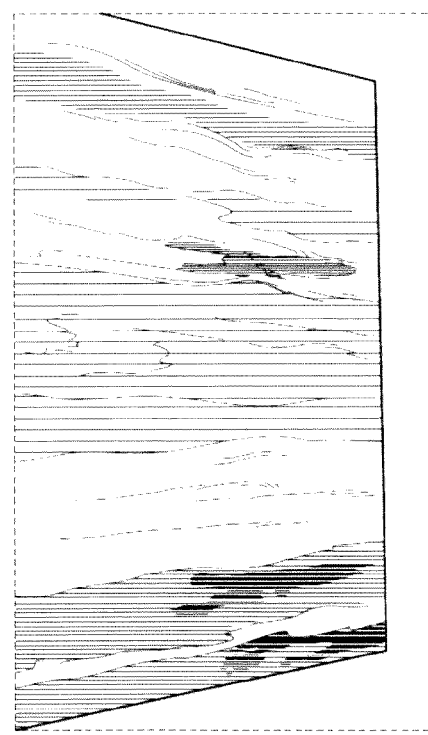

FIG. 2 shows a panel produced as described in FIG. 1 which however was printed in certain areas after the polishing and before application of the top-coat lacquer. The printing with a darker colour than the natural wood colour makes it possible to produce a panel having a more vibrant visual appearance than the natural panel. A water-based ink was used for the applied digital print.

The invention claimed is:

1. A panel comprising a non-flammable carrier board which is laminated at least on one side with a wood veneer as a visible real wood surface, wherein the wood veneer has a thickness of less than 0.5 mm and is laminated by means of a mineral glue onto the non-flammable carrier board, the mineral glue is a water glass, and the carrier board is a gypsum-based carrier board, a cement-bound panel or a calcium silicate panel.

2. The panel according to claim 1, wherein the wood veneer is printed at least in certain areas.

3. The panel according to claim 1, wherein the wood veneer is printed by means of multi-coloured digital printing.

4. The panel according to claim 2, wherein the wood veneer with or without print, is covered at least in certain areas by a top-coat lacquer.

5. The panel according to claim 1, wherein the panel conforms to a building material class A2.

6. The panel according to claim 5, wherein the panel conforms to a fire safety class A2 s1-d0 according to EN 13501-1.

7. The panel according to claim 1, wherein the gypsum-based carrier board is a gypsum fibre board or a concrete panel.

* * * * *

UNITED STATES PATENT AND TRADEMARK OFFICE
CERTIFICATE OF CORRECTION

PATENT NO. : 11,453,200 B2  
APPLICATION NO. : 16/310862  
DATED : September 27, 2022  
INVENTOR(S) : Karl Michael Knoblauch et al.

Page 1 of 1

It is certified that error appears in the above-identified patent and that said Letters Patent is hereby corrected as shown below:

On the Title Page

Column 1, Inventors, Line 2, delete "Volpertshausen" and insert -- Wolpertshausen --

Signed and Sealed this
Twenty-ninth Day of November, 2022

Katherine Kelly Vidal
*Director of the United States Patent and Trademark Office*